United States Patent [19]

Gartside et al.

[11] 4,288,235

[45] Sep. 8, 1981

[54] LOW RESIDENCE TIME SOLID-GAS SEPARATION DEVICE AND SYSTEM

[75] Inventors: Robert J. Gartside, Auburndale, Mass.; Herman N. Woebcke, Stamford, Conn.

[73] Assignee: Stone & Webster Engineering Corporation, Boston, Mass.

[21] Appl. No.: 55,148

[22] Filed: Jul. 6, 1979

[51] Int. Cl.³ .................... B01D 45/06; B01D 50/00
[52] U.S. Cl. .................... 55/196; 55/238; 55/258; 55/260; 55/267; 55/310; 55/345; 55/424; 55/432; 55/435; 55/449; 55/461; 55/466; 55/478
[58] Field of Search .................... 55/1, 319, 196, 345, 55/423, 426, 432, 260, 434, 435, 267, 447–450, 461–462, 464–466, 478, 424, 310–311, 238, 258, 428

[56] References Cited

U.S. PATENT DOCUMENTS

| | | | |
|---|---|---|---|
| 1,469,702 | 10/1923 | Spencer | 55/432 X |
| 2,328,325 | 8/1943 | Butikofer | 55/257 R X |
| 2,439,811 | 4/1948 | Jewell | 55/462 X |
| 2,698,224 | 12/1954 | Brooke | 209/144 X |
| 2,737,479 | 3/1956 | Nicholson | 55/461 X |
| 2,878,891 | 3/1959 | Ross et al. | 55/461 X |
| 3,247,651 | 4/1966 | Hutchings | 55/426 X |
| 3,443,368 | 5/1969 | Wilson et al. | 55/435 |
| 4,163,650 | 8/1979 | Watson et al. | 55/428 X |
| 4,219,407 | 8/1980 | Haddad et al. | 55/466 X |

FOREIGN PATENT DOCUMENTS

1088435 3/1955 France .................... 55/461

Primary Examiner—Kathleen J. Prunner
Attorney, Agent, or Firm—Morgan, Finnegan, Pine, Foley & Lee

[57] ABSTRACT

This invention relates to an apparatus and method for rapidly separating particulate solids from a mixed phase solids-gas stream which may be at velocities up to 150 ft./sec. and at high temperature. Specifically, the device is designed for incorporation at the discharge of solid-gas reacting systems having low residence time requirements and carried out in tubular type reactors. Separation is effected by projecting solids by centrifugal force against a bed of solids as the gas phase makes a 180° directional change, said solids changing direction only 90° relative to the incoming stream.

14 Claims, 10 Drawing Figures

LOW RESIDENCE TIME SOLID-GAS SEPARATION DEVICE AND SYSTEM

BACKGROUND OF INVENTION

Chemical reaction systems utilizing solids in contact with a gaseous or vaporized stream have long been employed. The solids may participate in the reaction as catalyst, provide heat required for an endothermic reaction, or both. Alternatively the solids may provide a heat sink in the case of an exothermic reaction. Fluidized bed reactors have substantial advantages, most notably an isothermal temperature profile. However, as residence time decreases the fluidized bed depth becomes shallower and increasingly unstable. For this reason tubular reactors employing solid-gas contact in pneumatic flow have been used and with great success, particularly in the catalytic cracking of hydrocarbons to produce gasolines where reaction residence times are between 2 and 5 seconds.

As residence times become lower, generally below 2 seconds and specifically below 1 second, the ability to separate the gaseous products from the solids is diminished because there is insufficient time to do so effectively. This occurs because the residence time requirements of separation means such as cyclones begin to represent a disproportionate fraction of the allowable reactor residence time. The problem is acute in reaction systems such as thermal cracking of hydrocarbons to produce olefins and catalytic cracking to produce gasoline using improved catalysts where the total reactor residence times between 0.2 and 1.0 seconds. In these reaction systems conventional separation devices may consume more than 35% of the allowable contact time between the two phases resulting in product degradation, coke formation, low yields and varying severity.

In non-catalytic, temperature dependent endothermic reactions, rather than separating the phases, it is possible to quench the entire product stream after the requisite reaction period. However, these solids are usually recycled and are regenerated by heating to high temperatures. A quench of the reactor effluent prior to separation would be thermally inefficient. However, it is economically viable to make a primary separation of the particulate solids before quench of the gaseous stream. The residual solids in the quenched stream may then be separated in a conventional separator inasmuch as solids gas contact is no longer a concern.

In some reaction systems, specifically catalytic reactions at low or moderate temperatures, quench of the product gas is undesireable from a process standpoint. In other cases the quench is ineffective in terminating the reaction. Thus, these reaction systems require immediate separation of the phases to remove catalyst from the gas phase. Once the catalyst has been removed, the mechanism for reaction is no longer present.

The prior art has attempted to separate the phases rapidly by use of centrifugal force or deflection means.

Nicholson U.S. Pat. No. 2,737,479 combines reaction and separation steps within a helically wound conduit containing a plurality of complete turns and having a plurality of gaseous product drawoffs on the inside surface of the conduit to separate solids from the gas phase by centrifugal force. Solids gravitate to the outer periphery of the conduit, while gases concentrate at the inner wall, and are removed at the drawoffs. Although the Nicholson reactor-separator separates the phases rapidly, it produces a series of gas product streams each at a different stage of feed conversion. This occurs because each product stream removed from the multiple product draw offs which are spaced along the conduit is exposed to the reaction conditions for a different time period in a reaction device which has inherently poor contact between solids and gases.

Ross et al U.S. Pat. No. 2,878,891 attempted to overcome this defect by appending to a standard riser reactor a modification of Nicholson's separator. Ross's separator is comprised of a curvilinear conduit making a separation through a 180° to 240° turn. Centrifugal force directs the heavier solids to the outside wall of the conduit allowing gases that accumulate at the inside wall to be withdrawn through a single drawoff. While the problem of product variation is decreased to some extent, other drawbacks of the Nicholson apparatus are not eliminated.

Both devices effect separation of gas from solids by changing the direction of the gas 90° at the withdraw point, while allowing solids to flow linearly to the separator outlet. Because solids do not undergo a directional change at the point of separation, substantial quantities of gas flow past the withdraw point to the solids outlet. For this reason both devices require a conventional separator at the solids outlet to remove excess gas from the solid particles. Unfortunately, product gas removed in the conventional separator has remained in intimate contact with the solids, has not been quenched, and is, therefore, severely degraded.

Another drawback of these devices is the limitation on scale-up to commercial size. As conduit diameter increases the path traveled by the mixed phase stream increases proportionately so that large diameter units have separator residence times approaching those of conventional cyclones. Increasing velocity can reduce residence time, but as velocities exceed 60 to 75 ft./sec. erosion by particles impinging along the entire length of the curvilinear path becomes progressively worse. Reduction of the flow path length by decreasing the radius of curvature of the conduit also reduces residence time, but increases the angle of impact of solids against the wall thereby accelerating erosion.

Pappas U.S. Pat. No. 3,074,878 devised a low residence time separator using deflection means wherein the solid gas stream flowing in a tubular conduit impinges upon a deflector plate causing the solids, which have greater inertia, to be projected away from a laterally disposed gas withdrawal conduit located beneath said deflector plate. Again, solids do not change direction while the gas phase changes direction relative to the inlet stream by only 90° resulting in inherently high entrainment of solids in the effluent gas. While baffles placed across the withdrawal conduit reduce entrainment, these baffles as well as the deflector plate are subject to very rapid erosion in severe operating conditions of high temperature and high velocity. Thus, many of the benefits of separators of the prior art are illusory because of limitations in their efficiency, operable range, and scale-up potential.

SUMMARY OF INVENTION

It is an object of the separator of this invention to obtain a primary separation of particulate solids from a mixed phase gas-solid stream.

It is also an object of the separator to effect the separation rapidly and with a minimum of erosion.

An additional object of this invention is to provide a separation system that obtains essentially complete separation of gas from the solids phase, although a controlled flow of gas with the solids phase is consistent with the operation of the device.

Another object of this invention is to provide a separation system to provide essentially complete separation of solids from the mixed phase stream.

A further object is to effect a separation at high temperature and/or high velocity conditions with a minimum of gas product degradation.

Another object of this invention is to provide a method for rapidly attaining a primary separation of solids from a mixed phase gas-solid stream.

These and other objects of this invention will be apparent from an inspection of the specification and figures and claims.

The separation device and system of the present invention rapidly disengages particulate solids from a mixed phase gas-solids stream with a minimum of erosion. The separator consists of a chamber having an inlet at one end and a solids outlet at the other with the gas outlet therebetween. Each inlet and outlet is normal to the basic flow pattern within the separator. The gas outlet is oriented so that the gas portion of the feed undergoes a 180° change in direction, while the solids outlet is preferably aligned for downflow. Solids are projected by centrifugal force to a wall of the separator normal to and opposite to the inlet as the gas changes direction 180° forming thereat a bed of solids having an arcuate surface configuration subtending an arc of approximately 90° of a circle upon which subsequent solids impinge. The curve of the bed extends to the solids outlet and forms a path along which solids flow. Erosion of the wall opposite the inlet of the separator is diminished or eliminated by formation of the bed, which also aids in establishing a U-shaped 180° flow pattern of the gas stream.

The separation system is comprised of the primary separator, a secondary separator, and a stripping vessel. The gas outlet of the primary separator is connected to the secondary separator via a conduit, while the stripping vessel is similarly connected to the solids outlet. Pressure regulating means are used to control the flow of gas to the stripping vessel.

In the preferred separator embodiment a weir is used to establish a more stable bed, although a weirless separator may be used. Alternatively, the solids outlet flow path may be restricted by other means which aid in the deaeration of solids. However, in all embodiments of the separator of the present invention the loss of gas entrained with the solids phase is small because of the directional changes imposed on both gas and solid phases.

In the preferred embodiment the separator is designed within several geometric constraints in order to maximize the separation efficiency. It is essential that the flow path have a rectangular cross section in order to obtain good efficiency. To obtain high efficiencies a separator with an inlet inside diameter $D_i$ should preferably have a flow path height of at least $D_i$ or 4 inches, whichever is greater. Similarly, the width of the flow path should be between 0.75 and 1.25 $D_i$ while the distance between inlet and gas outlet centerlines should be no greater than 4 times $D_i$.

DESCRIPTION OF INVENTION

Figure 1:
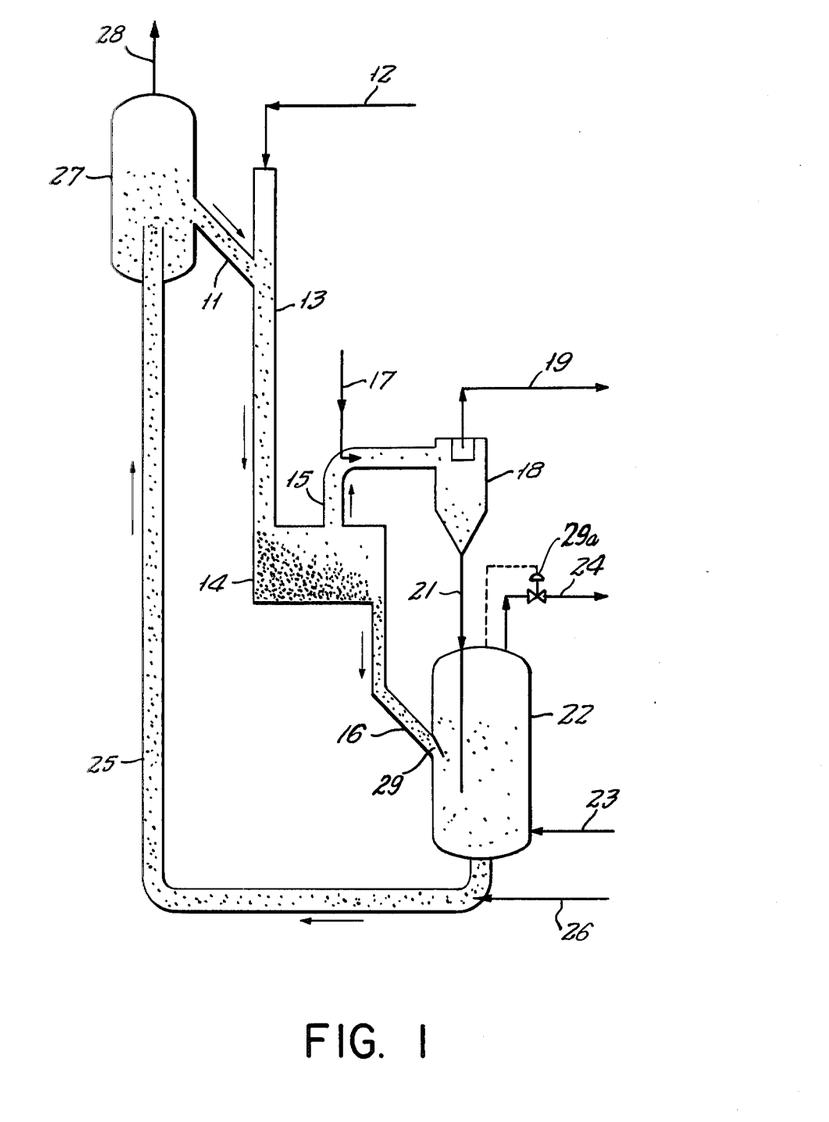
FIG. 1 is a schematic flow diagram of the separation system of the present invention as appended to a typical tubular reactor.

FIG. 1 is a schematic flow diagram showing the installation of the separator system of the present invention in a typical tubular reactor system handling dilute phase solid-gas mixtures. Solids and gas enter tubular reactor 13 through lines 11 and 12 respectively. The reactor effluent flows directly to separator 14 where a separation into a gas phase and a solids phase stream is effected. The gas phase is removed via line 15, while the solid phase is sent to stripping vessel 22 via line 16. Depending upon the nature of the process and the degree of separation, an inline quench of the gas leaving the separator via line 15 may be made by injecting quench material from line 17. Usually, the product gas contains residual solids and is sent to a secondary separator 18, preferably a conventional cyclone. Quench material should be introduced in line 15 in a way that precludes back flow of quench material to the separator. The residual solids are removed from separator 18 via line 21, while essentially solids free product gas is removed overhead through line 19. Solids from lines 16 and 21 are stripped of gas impurities in fluidized bed stripping vessel 22 using steam or other inert fluidizing gas admitted via line 23. Vapors are removed from the stripping vessel through line 24 and, if economical or if need be, sent to down-stream purification units. Stripped solids removed from the vessel 22 through line 25 are sent to regeneration vessel 27 using pneumatic transport gas from line 26. Off gases are removed from the regenerator through line 28. After regeneration the solids are then recycled to reactor 13 via line 11.

The separator 14 should disengage solids rapidly from the reactor effluent in order to prevent product degradation and ensure optimal yield and selectivity of the desired products. Further, the separator 14 operates in a manner that eliminates or at least significantly reduces the amount of gas entering the stripping vessel 22 inasmuch as this portion of the gas product would be severely degraded by remaining in intimate contact with the solid phase. This is accomplished with a positive seal which has been provided between the separator 14 and the stripping vessel 22. Finally, the separator 14 operates so that erosion is minimized despite high temperature and high velocity conditions that are inherent in many of these processes. The separator system of the present invention is designed to meet each one of these criteria as is described below.

Figure 2:
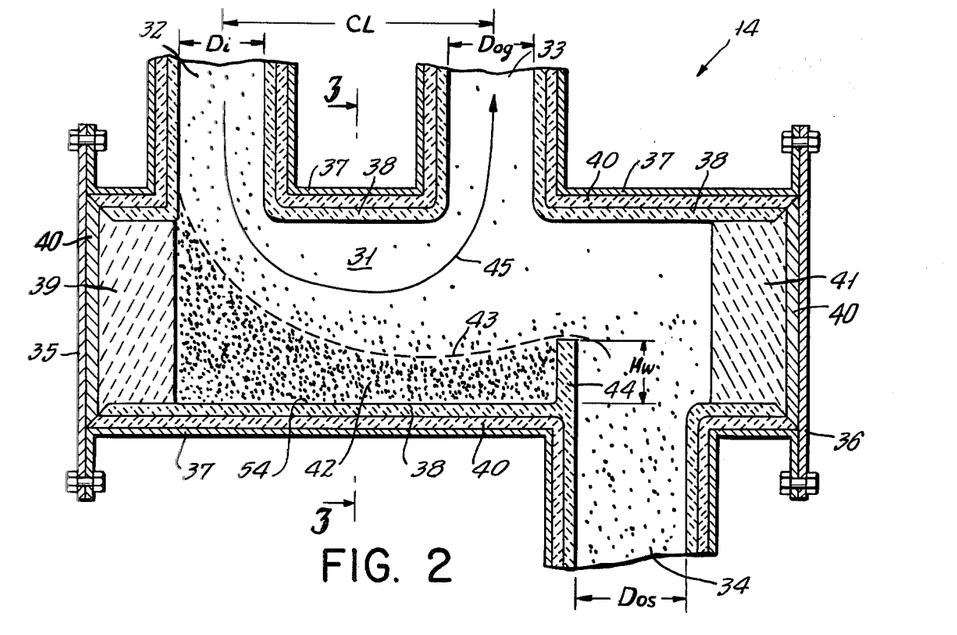
FIG. 2 is a cross sectional elevational view of the preferred embodiment of the separator.

FIG. 2 is a cross sectional elevational view showing the preferred embodiment of solids-gas separation device 14 of the present invention. The separator 14 is provided with a separator shell 37 and is comprised of a solids-gas disengaging chamber 31 having an inlet 32 for the mixed phase stream, a gas phase outlet 33, and a solids phase outlet 34. The inlet 32 and the solids outlet 34 are preferably located at opposite ends of the chamber 31, while the gas outlet 33 lies at a point therebetween. Clean-out and maintenance manways 35 and 36 may be provided at either end of the chamber 31. The separator shell 37 and manways 35 and 36 preferably are lined with erosion resistent linings 38, 39 and 41 respectively which may be required if solids at high velocities are encountered. Typical commercially available materials for erosion resistent lining include Carborundum Precast Carbofrax D, Carborundum Precast Alfrax 201 or their equivalent. A thermal insulation lining 40 may be placed between shell 37 and lining 38 and between the manways and their respective erosion resistent linings when the separator is to be used in high temperature service. Thus, process temperatures above 1500° F. (870° C.) are not inconsistent with the utilization of this device.

Figure 3:
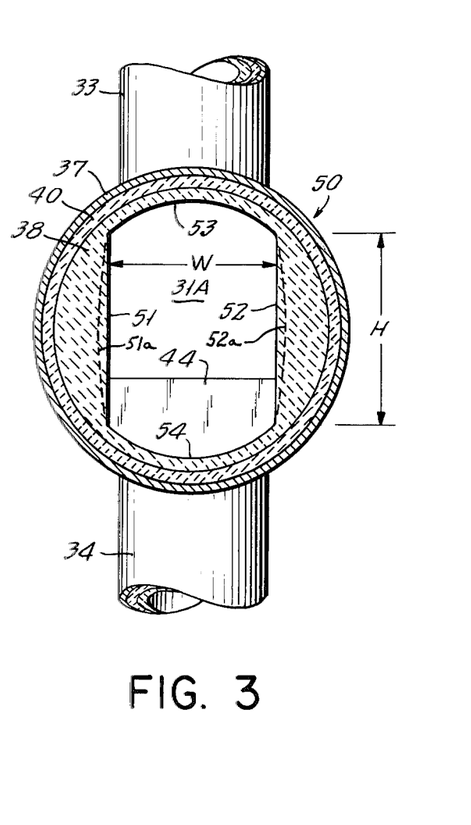
FIG. 3 is a cutaway view through section 3—3 of FIG. 2.
Figure 4:
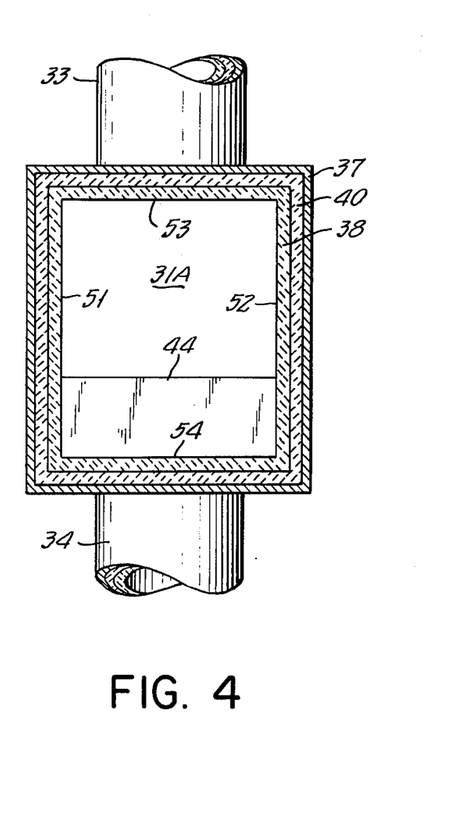
FIG. 4 is a cutaway view through section 3—3 of FIG. 2 showing an alternate geometric configuration of the separator shell.

FIG. 3 shows a cutaway view of the separator along section 3—3. For greater strength and ease of construction the separator 14 shell is preferably fabricated from cylindrical sections such as pipe 50, although other materials may, of course, be used. It is essential that longitudinal side walls 51 and 52 should be rectilinear, or slightly arcuate as indicated by the dotted lines 51a and 52a. Thus, flow path 31A through the separator is essentially rectangular in cross section having a height H and width W as shown in FIG. 3. The embodiment shown in FIG. 3 defines the geometry of the flow path by adjustment of the lining width for walls 51 and 52. Alternatively, baffles, inserts, weirs or other means may be used. In like fashion the configuration of walls 53 and 54 transverse to the flow path may be similarly shaped, although this is not essential. FIG. 4 is a cutaway view along Section 3—3 of FIG. 2 wherein the separation shell 37 is fabricated from a rectangular conduit. Because the shell 37 has rectilinear walls 51 and 52 it is not necessary to adjust the width of the flow path with a thickness of lining. Linings 30 and 40 could be added for erosion and thermal resistence respectively.

Again referring to FIG. 2, inlet 32 and outlets 33 are disposed normal to flow path 31A (shown in FIG. 3) so that the incoming mixed phase stream from inlet 32 is required to undergo a 90° change in direction upon entering the chamber. As a further requirement, however, the gas phase outlet 33 is also oriented so that the gas phase upon leaving the separator has completed a 180° change in direction.

Centrifugal force propels the solid particles to the wall 54 opposite inlet 32 of the chamber 31, while the gas portion, having less momentum, flows through the vapor space of the chamber 31. Initially, solids impinge on the wall 54, but subsequently accumulate to form a static bed of solids 42 which ultimately form in a surface configuration having a curvilinear arc 43 of approximately 90°, of a circle. Solids impinging upon the bed are moved along the curvilinear arc 43 to the solids outlet 34, which is preferably oriented for downflow of solids by gravity. The exact shape of the arc 43 is determined by the geometry of the particular separator and the inlet stream parameters such as velocity, mass flowrate, bulk density, and particle size. Because the force imparted to the incoming solids is directed against the static bed 42 rather than the separator 14 itself, erosion is minimal. Separator efficiency, defined as the removal of solids from the gas phase leaving through outlet 33, is, therefore, not affected adversely by high inlet velocities, up to 150 ft./sec., and the separator 14 is operable over a wide range of dilute phase densities, preferably between 0.1 and 10.0 lbs./ft$^3$. The separator 14 of the present invention achieves efficiencies of about 80%, although the preferred embodiment, discussed below, can obtain over 90% removal of solids.

It has been found that separator efficiency is dependent upon separator geometry, and more particularly, the flow path must be essentially rectangular, and there is an optimum relationship between the height H and and the sharpness of the U-bend in the gas flow.

Referring to FIGS. 2 and 3 we have found that for a given height H of chamber 31, efficiency increases as the 180° U-bend between inlet 32 and outlet 33 becomes progressively sharper; that is, as outlet 33 is brought progressively closer to inlet 32. Thus, for a given H the efficiency of the separator increases as the flow path and, hence, residence time decreases. Assuming an inside diameter $D_i$ of inlet 32, the preferred distance CL between the centerlines of inlet 32 and outlet 33 is not greater than 4.0 $D_i$, while the most preferred distance between said centerlines is between 1.5 and 2.5 $D_i$. Below 1.5 $D_i$ better separation is obtained but difficulty in fabrication makes this embodiment less attractive in most instances. Should this latter embodiment be desired, the separator 14 would probably require a unitary casting design because inlet 32 and outlet 33 would be too close to one another to allow welded fabrication.

It has been found that the height of flow path H should be at least equal to the value of $D_i$ or 4 inches in height, whichever is greater. Practice teaches that if H is less than $D_i$ or 4 inches the incoming stream is apt to disturb the bed solids 42 thereby re-entraining solids in the gas product leaving through outlet 33. Preferably H is on the order of twice $D_i$ to obtain even greater separation efficiency. While not otherwise limited, it is apparent that too large an H eventually merely increases residence time without substantive increases in efficiency. The width W of the flow path is preferably between 0.75 and 1.25 times $D_i$, most preferably between 0.9 and 1.10 $D_i$.

Outlet 33 may be of any inside diameter. However, velocities greater than 75 ft./sec. can cause erosion because of residual solids entrained in the gas. The inside diameter of outlet 34 should be sized so that a pressure differential between the stripping vessel 22 shown in FIG. 1 and the separator 14 exist such that a static height of solids is formed in solids outlet line 16. The static height of solids in line 16 forms a positive seal which prevents gases from entering the stripping vessel 22. The magnitude of the pressure differential between the stripping vessel 22 and the separator 14 is determined by the force required to move the solids in bulk flow to the solids outlet 34 as well as the height of solids in line 16. As the differential increases the net flow of gas to the stripping vessel 22 decreases. Solids, having gravitational momentum, overcome the differential, while gas preferentially leaves through the gas outlet 33.

By regulating the pressure in the stripping vessel 22 it is possible to control the amount of gas going to the stripper. The pressure regulating means may include a check or "flapper" valve 29 at the outlet of line 16, or a pressure control 29a device on vessel 22. Alternatively, as suggested above, the pressure may be regulated by selecting the size of the outlet 34 and conduit 16 to obtain hydraulic forces acting on the system that set the flow of gas to the stripper 22. While such gas is degraded, we have found that an increase in separation efficiency occurs with a bleed of gas to the stripper of less than 10%, preferably between 2 and 7%. Economic and process considerations would dictate whether this mode of operation should be used. It is also possible to design the system to obtain a net backflow of gas from the stripping vessel. This gas flow should be less than 10% of the total feed gas rate.

By establishing a minimal flow path, consistent with the above recommendations, residences times as low as 0.1 seconds or less may be obtained, even in separators having inlets over 3 feet in diameter. Scale-up to 6 feet in diameter is possible in many systems where residence times approaching 0.5 seconds are allowable.

In the preferred embodiment of FIG. 2 a weir 44 is placed across the flow path at a point at or just beyond the gas outlet to establish a positive height of solids prior to solids outlet 34. By installing a weir (or an equivalent restriction) at this point a more stable bed is established thereby reducing turbulence and erosion. Moreover, the weir 44 establishes a bed which has a crescent shaped curvilinear arc 43 of slightly more than 90° of a circle. An arc of this shape diverts gas towards the gas outlet and creates the U-shaped gas flow pattern illustrated diagrammatically by line 45 in FIG. 2. Without the weir 44 an arc somewhat less than or equal to 90° of a circle would be formed, and which would extend asymptotically toward outlet 34 as shown by dotted line 60 in the schematic diagram of the separator of FIG. 5. While neither efficiency nor gas loss (to the stripping vessel) is affected adversely, the flow pattern of line 61 increases residence time, and more importantly, creates greater potential for erosion at areas 62, 63 and 64.

Figure 5:
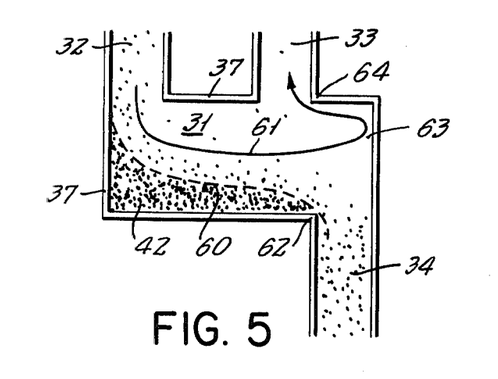
FIG. 5 is a sketch of the separation device of the present invention indicating gas and solids phase flow patterns in a separator not having a weir.
Figure 6:
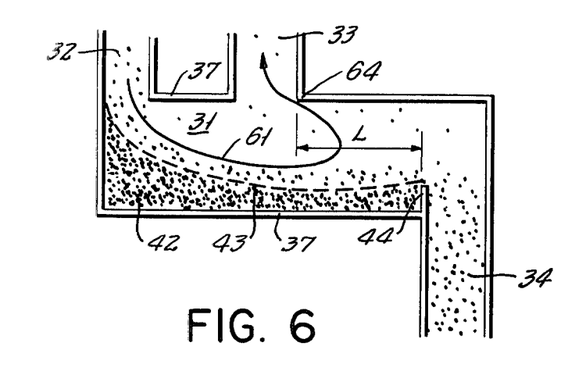
FIG. 6 is a sketch of an alternate embodiment of the separation device having a weir and an extended separation chamber.

The separator of FIG. 6 is a schematic diagram of another embodiment of the separator 14, said separator 14 having an extended separation chamber in the longitudinal dimension. Here, the horizontal distance L between the gas outlet 34 and the weir 44 is extended to establish a solids bed of greater length. L is preferably less than or equal to 5 $D_i$. Although the gas flow pattern 61 does not develop the preferred U-shape, a crescent shaped arc is obtained which limits erosion potential to area 64. Embodiments shown by FIGS. 5 and 6 are useful when the solids loading of the incoming stream is low. The embodiment of FIG. 5 also has the minimum pressure loss and may be used when the velocity of the incoming stream is low.

Figure 7:
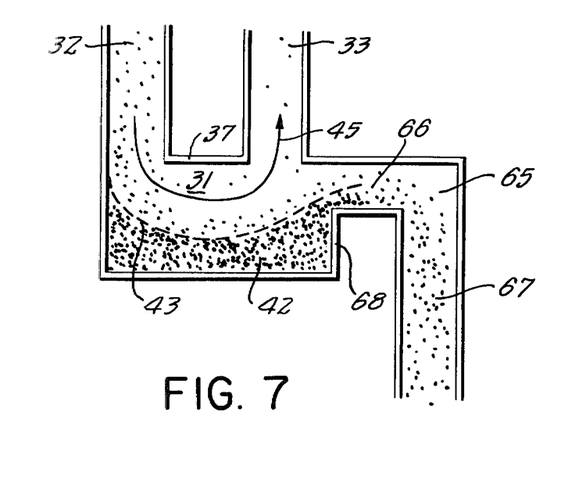
FIG. 7 is a sketch of an alternate embodiment of the separation device wherein a stepped solids outlet is employed, said outlet having a section collinear with the flow path as well as a gravity flow section.

As shown in FIG. 7 it is equally possible to use a stepped solids outlet 65 having a section 66 collinear with the flow path as well as a gravity flow section 67. Wall 68 replaces weir 44, and arc 43 and flow pattern 45 are similar to the preferred embodiment of FIG. 2. Because solids accumulate in the restricted collinear section 66, pressure losses are greater. This embodiment, then, is not preferred where the incoming stream is at low velocity and cannot supply sufficient force to expel the solids through outlet 65. However, because of the restricted solids flow path, better deaeration is obtained and gas losses are minimal.

Figure 8:
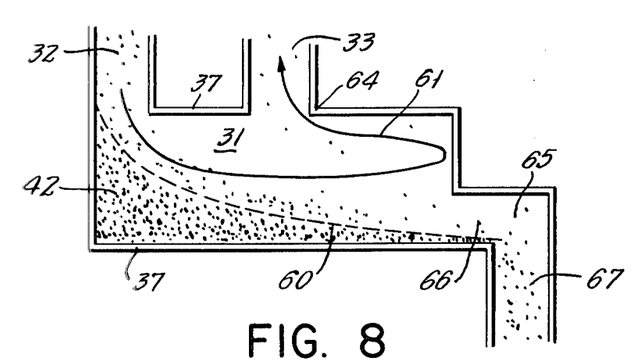
FIG. 8 is a variation of the embodiment of FIG. 7 in which the solids outlet of FIG. 7 is used, but is not stepped.

FIG. 8 illustrates another embodiment of the separator 14 of FIG. 7 wherein the solids outlet is not stepped. Although a weir is not used, the outlet restricts solids flow which helps form the bed 42. As in FIG. 6, an extended L distance between the gas outlet and solids outlet may be used.

Figure 9:
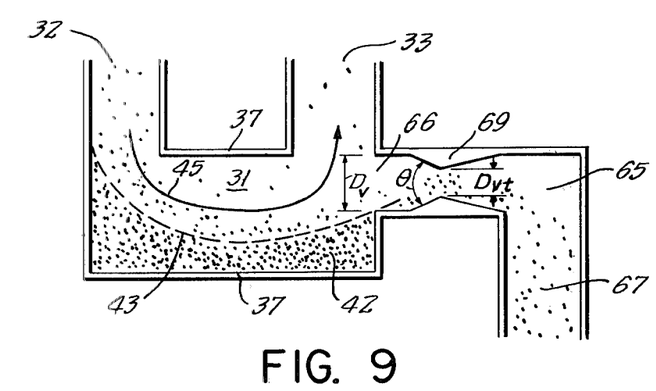
FIG. 9 is a sketch of a variation of the separation device of FIG. 7 wherein a venturi restriction is incorporated in the collinear section of the solids outlet.
Figure 10:
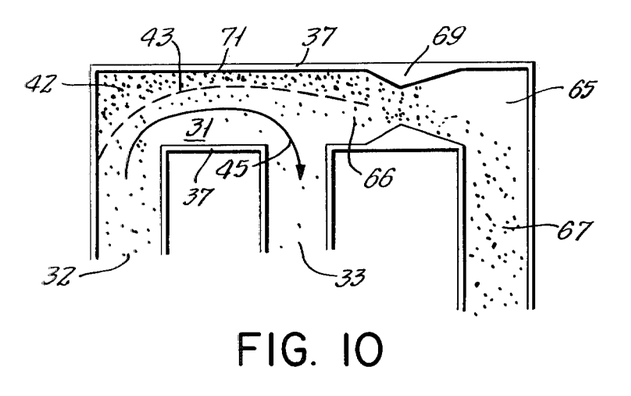
FIG. 10 is a variation of the embodiment of FIG. 9 oriented for use with a riser type reactor.

The separator of FIG. 7 or 8 may be used in conjunction with a venturi, an orifice, or an equivalent flow restriction device as shown in FIG. 9. The venturi 69 having dimensions $D_v$ (diameter at venturi inlet), $D_{vt}$ (diameter of venturi throat), and $\theta$ (angle of cone formed by projection of convergent venturi walls) is placed in the collinear section 66 of the outlet 65 to greatly improve deaeration of solids. The embodiment of FIG. 10 is a variation of the separator shown in FIG. 9. Here, inlet 32 and outlet 33 are oriented for use in a riser type reactor. Solids are propelled to the wall 71 and the bed thus formed is kept in place by the force of the incoming stream. As before the gas portion of the feed follows the U-shaped pattern of line 45. However, an asymptotic bed will be formed unless there is a restriction in the solids outlet. A weir would be ineffective in establishing bed height, and would deflect solids into the gas outlet. For this reason the solids outlet of FIG. 9 is preferred. Most preferably, the venturi 69 is placed in collinear section 66 as shown in FIG. 10 to improve the deaeration of the solids. Of course, each of these alternate embodiment may have one or more of the optional design features of the basic separator discussed in relation to FIGS. 2, 3 and 4.

The separator of the present invention is more clearly illustrated and explained by the examples which follow. In these examples, which are based on data obtained during experimental testing of the separator design, the separator has critical dimensions specified in Table I. These dimensions (in inches except as noted) are indicated in the various drawing figures and listed in the Nomenclature below:

CL: Distance between inlet and gas outlet centerlines
$D_i$: Inside diameter of inlet
$D_{og}$: Inside diameter of gas outlet
$D_{os}$: Inside diameter of solids outlet
$D_v$: Diameter of venturi inlet
$D_{vt}$: Diameter of venturi throat
H: Height of flow path
$H_w$: Height of weir or step
L: Length from gas outlet to weir or step as indicated in FIG. 6
W: Width of flow path
$\theta$: Angle of cone formed by projection of convergent venturi walls, degrees

TABLE I

Dimensions of Separators in Examples 1 to 10, inches*

| Dimension | 1 | 2 | 3 | 4 | 5 | 6 | 7 | 8 | 9 | 10 |
|---|---|---|---|---|---|---|---|---|---|---|
| CL | 3.875 | 3.875 | 3.875 | 3.875 | 5.875 | 5.875 | 11 | 11 | 3.5 | 3.5 |
| $D_i$ | 2 | 2 | 2 | 2 | 2 | 2 | 6 | 6 | 2 | 2 |
| $D_{og}$ | 1.75 | 1.75 | 1.75 | 1.75 | 1.75 | 1.75 | 4 | 4 | 1 | 1 |
| $D_{os}$ | 2 | 2 | 2 | 2 | 2 | 2 | 6 | 6 | 2 | 2 |
| $D_v$ | — | — | — | — | — | — | — | — | — | 2 |
| $D_{vt}$ | — | — | — | — | — | — | — | — | — | 1 |
| H | 4 | 4 | 4 | 4 | 4 | 4 | 12 | 12 | 7.5 | 6.75 |
| $H_w$ | 0.75 | 0.75 | 0.75 | 0.75 | 0.75 | 0.75 | 2.25 | 2.25 | 0 | 4.75 |
| L | 0 | 2 | 2 | 0 | 0 | 0 | 0 | 0 | 10 | 0 |
| W | 2 | 2 | 2 | 2 | 2 | 2 | 6 | 6 | 2 | 2 |
| θ, degrees | — | — | — | — | — | — | — | — | — | 28.1° |

*Except as noted

EXAMPLE 1

In this example a separator of the preferred embodiment of FIG. 2 was tested on a feed mixture of air and silica alumina. The dimensions of the apparatus are specified in Table I. Note that the distance L from the gas outlet to the weir was zero.

The inlet stream was comprised of 85 ft.$^3$/min. of air and 52 lbs./min. of silica alumina having a bulk density of 70 lbs./ft.$^3$ and an average particle size of 100 microns. The stream density was 0.612 lbs./ft.$^3$ and the operation was performed at ambient temperature and atmospheric pressure. The velocity of the incoming stream through the 2 inch inlet was 65.5 ft./sec., while the outlet gas velocity was 85.6 ft./sec. through a 1.75 inch diameter outlet. A positive seal of solids in the solids outlet prevented gas from being entrained in the solids leaving the separator. Bed solids were stabilized by placing a 0.75 inch weir across the flow path.

The observed separation efficiency was 89.1%, and was accomplished in a gas phase residence time of approximately 0.008 seconds. Efficiency is defined as the percent removal of solids from the inlet stream.

EXAMPLE 2

The gas-solids mixture of Example 1 was processed in a separator having a configuration illustrated by FIG. 6. In the example the L dimension is 2 inches; all other dimensions are the same as Example 1. By extending the separation chamber along its longitudinal dimension, the flow pattern of the gas began to deviate from the U-shaped discussed above. As a result residence time was longer and turbulence was increased. Separation efficiency for this example was 70.8%.

EXAMPLE 3

The separator of Example 2 was tested with an inlet stream comprised of 85 ft.$^3$/min. of air and 102 lbs./min. of silica alumina which gave a stream density of 1.18 lbs./ft.$^3$, or approximately twice that of Example 2. Separation efficiency improved to 83.8%.

EXAMPLE 4

The preferred separator of Example 1 was tested at the inlet flow rate of Example 3. Efficiency increased slightly to 91.3%.

EXAMPLE 5

The separator of FIG. 2 was tested at the conditions of Example 1. Although the separation dimensions are specified in Table I note that the distance CL between inlet and gas outlet centerlines was 5.875 inches, or about three times the diameter of the inlet. This dimension is outside the most preferred range for CL which is between 1.50 and 2.50 Di. Residence time increased to 0.01 seconds, while efficiency was 73.0%.

EXAMPLE 6

Same conditions apply as for Example 5 except that the solids loading was increased to 102 lbs./min. to give a stream density of 1.18 lbs./ft.$^3$. As observed previously in Examples 3 and 4, the separator efficiency increased with higher solids loading to 90.6%.

EXAMPLE 7

The preferred separator configuration of FIG. 2 was tested in this Example. However, in this example the apparatus was increased in size over the previous examples by a factor of nine based on flow area. A 6 inch inlet and 4 inch outlet were used to process 472 ft.$^3$/min. of air and 661 lbs./min. of silica alumina at 180° F. and 12 psig. The respective velocities were 40 and 90 ft./sec. The solids had a bulk density of 70 lbs./ft.$^3$ and the stream density was 1.37 lbs./ft.$^3$ Distance CL between inlet and gas outlet centerlines was 11 inches, or 1.83 times the inlet diameter; distance L was zero. The bed was stabilized by a 2.25 inch weir, and gas loss was prevented by a positive seal of solids. However, the solids were collected in a closed vessel, and the pressure differential was such that a positive flow of displaced gas from the collection vessel to the separator was observed. This volume was approximately 9.4 ft.$^3$/min. Observed separator efficiency was 90.0%, and the gas phase residence time approximately 0.02 seconds.

EXAMPLE 8

The separator used in Example 7 was tested with an identical feed of gas and solids. However, the solids collection vessel was vented to the atmosphere and the pressure differential adjusted such that 9% of the feed gas, or 42.5 ft.$^3$/min., exited through the solids outlet at a velocity of 3.6 ft./sec. Separator efficiency increased with this positive bleed through the solids outlet to 98.1%.

EXAMPLE 9

The separator of FIG. 8 was tested in a unit having a 2 inch inlet and a 1 inch gas outlet. The solids outlet was 2 inches in diameter and was located 10 inches away from the gas outlet (dimension L). A weir was not used. The feed was comprised of 85 ft.$^3$/min. of air and 105 lbs./min. of spent fluid catalytic cracker catalyst having a bulk density of 45 lbs./ft.$^3$ and an average particle size of 50 microns. This gave a stream density of 1.20 lbs./ft.³ Gas inlet velocity was 65 ft./sec., while the gas outlet velocity was 262 ft./sec. As in Example 7 there was a positive counter-current flow of displaced gas from the collection vessel to the separator. This flow was approximately 1.7 ft.³/min. at a velocity of 1.3 ft./sec. Operation was at ambient temperature and atmospheric pressure. Separator efficiency was 95.0%.

EXAMPLE 10

The separator of FIG. 9 was tested on a feed comprised of 85 ft.³/min. of air and 78 lbs./min. of spent Fluid Catalytic Cracking catalyst. The inlet was 2 inches in diameter which resulted in a velocity of 65 ft./sec., the gas outlet was 1 inch in diameter which resulted in an outlet velocity of 262 ft./sec. This separator had a stepped solids outlet with a venturi in the collinear section of the outlet. The venturi mouth was 2 inches in diameter, while the throat was 1 inch. A cone of 28.1° was formed by projection of the convergent walls of the venturi. An observed efficiency of 92.6% was measured, and the solids leaving the separator were completely deaerated except for interstitial gas remaining in the solids' voids.

We claim:

1. A solids-gas separator designed to effect rapid removal of particulate solids from a dilute mixed phase stream of solids and gas, the separator comprising a chamber for disengaging solids from the incoming mixed phase stream, said chamber having rectilinear longitudinal walls to form a flow path essentially rectangular in cross section, said chamber also having a mixed phase inlet, a gas phase outlet, and a solids phase outlet, with the mixed phase inlet being at one end of the chamber and disposed normal to one wall of the rectilinear chamber, said solids phase outlet being at the other end of the chamber and suitably arranged for downflow of discharged solids by gravity, and said gas phase outlet being therebetween and oriented to effect a 180° change in direction of the gas, and wherein said separator further comprises a weir disposed in said chamber and extending across said flow path adjacent said gas phase outlet upstream of said solids phase outlet.

2. A solids-gas separator designed to effect rapid removal of particulate solids from a dilute mixed phase stream of solids and gas, the separator comprising a chamber for disengaging solids from the incoming mixed phase stream, said chamber having slightly arcuate longitudinal walls to form a flow path essentially rectangular in cross section, said chamber also having a mixed phase inlet, a gas phase outlet, and a solids phase outlet, with the mixed phase inlet being at one end of the chamber and disposed normal to one wall of the rectilinear chamber, and the solids phase outlet being at the other end of the chamber and suitably arranged for downflow of discharged solids by gravity, and said gas phase outlet being therebetween and oriented to effect a 180° change in direction of the gas, and wherein said separator further comprises a weir disposed in said chamber and extending across said flow path adjacent said gas phase outlet upstream of said solids phase outlet.

3. The separator of claim 1 or 2 wherein the mixed phase inlet is of inside diameter $D_i$, and which separator is further characterized by the rectilinear flow path having a preferred height H equal to at least $D_i$ or 4 inches, whichever is greater, and with a preferred width W between 0.75 and 1.25 $D_i$, and wherein the gas phase outlet is located between the mixed phase inlet and the solids phase outlet at a preferred distance from said mixed phase inlet which is no greater than 4.0 $D_i$ as measured between their respective centerlines.

4. The separator of claims 1 or 2 wherein the walls of the chamber are lined with an erosion resistant lining.

5. The separator of claim 4, further comprised of a thermal insulated lining placed between the chamber walls and the erosion resistant lining.

6. A solids-gas separator designed to effect rapid removal of particulate solids from a dilute mixed phase stream of solids and gas, the separator comprising a longitudinal chamber for disengaging solids from the incoming mixed phase stream, said chamber being fabricated of circular cross section to form a flow path, flow path shaping means disposed in said chamber such that said flow path is essentially rectangular in cross section, said chamber also having a mixed phase inlet, a gas phase outlet, and a solids phase outlet, with the mixed phase inlet being at one end of the chamber and disposed normal to the flow path, the solids phase outlet being at the other end of the chamber and suitably arranged for downflow of discharged solids by gravity, and the gas phase outlet being therebetween oriented to effect a 180° change in direction of the gas.

7. The separator of claim 6 wherein the mixed phase inlet is of inside diameter $D_i$, and which separator is further characterized by the flow path having a preferred height H equal to at least $D_i$ or 4 inches, whichever is greater, and with a preferred width W between 0.75 and 1.25 $D_i$, and wherein the gas phase outlet is located between the mixed phase inlet and solids phase outlet at a preferred distance from said mixed phase inlet which is no greater than 4.0 $D_i$ as measured between their respective centerlines.

8. The separator of claims 1, 2, 6 or 7, further comprising a clean-out manway on one or both ends of the separator chamber.

9. A solids-gas separation system to separate a dilute mixed phase stream of gas and particulate solids into an essentially solids free gas stream, the separation system comprising:

a chamber for rapidly disengaging about 80% of the particulate solids from the incoming dilute mixed phase stream, said chamber having approximately rectilinear longitudinal side walls to form a flow path of height H and width W approximately rectangular in cross section, said chamber also having a mixed phase inlet of inside width $D_i$, a gas outlet, and a solids outlet, said inlet being at one end of the chamber and disposed normal to the flow path whose height H is equal to at least $D_i$ or 4 inches, whichever is greater, and whose width W is no less than 0.75 $D_i$ but no more than 1.25 $D_i$, said solids outlet being at the opposite end of the chamber and being suitably arranged for downflow of discharged solids by gravity, and said gas outlet being therebetween at a distance no greater than 4 $D_i$ from the inlet as measured between respective centerlines and oriented to effect a 180° change in direction of the gas whereby resultant centrifugal forces direct the solid particles in the incoming stream toward a wall of the chamber opposite to the inlet forming thereat and maintaining an essentially static bed of solids, the surface of the bed defining a curvilinear path of an arc of approximately 90° of a circle for the outflow of solids to the solids outlet, a secondary solids-gas separator, said secondary separator removing essentially all of the residual solids, a first conduit connecting the gas outlet from the chamber to the secondary separator, a vessel connected to said solids outlet to receive the discharge of solids, said vessel stripping residual gas from the solids using an inert gas, a second conduit connecting said vessel and the solids outlet, and, pressure balance means to maintain a height of solids in said second conduit to provide a positive seal between the chamber and vessel.

10. The separation system of claim 9 wherein the pressure balance means is the hydraulic forces acting on the chamber, second conduit and vessel, the second conduit being sized for sufficient pressure loss to provide the height of solids.

11. The separation system of claim 9 wherein the pressure balance means is a check valve at the outlet end of the second conduit.

12. A solids-gas separation system to separate a dilute mixed phase stream of gas and particulate solids into an essentially solids free gas stream, the separation system comprising:

a chamber for rapidly disengaging about 80% of the particulate solids from the incoming dilute mixed phase stream, said chamber having approximately rectilinear longitudinal side walls to form a flow path of height H and width W approximately rectangular in cross section, said chamber also having a mixed phase inlet of inside width $D_i$, a gas outlet, and a solids outlet, said inlet being at one end of the chamber and disposed normal to the flow path whose height H is equal to at least $D_i$ or 4 inches, whichever is greater, and whose width W is no less than 0.75 $D_i$ but no more than 1.25 $D_i$, said solids outlet being at the opposite end of the chamber and being suitably arranged for downflow of discharged solids by gravity, and said gas outlet being therebetween at a distance no greater than 4 $D_i$ from the inlet as measured between respective centerlines and oriented to effect a 180° change in direction of the gas whereby resultant centrifugal forces direct the solid particles in the incoming stream toward a wall of the chamber opposite to the inlet forming thereat and maintaining an essentially static bed of solids, the surface of the bed defining a curvilinear path of an arc of approximately 90° of a circle for the outflow of solids to the solids outlet, a secondary solids-gas separator, said secondary separator removing essentially all of the residual solids, a first conduit connecting the gas outlet from the chamber to the secondary separator, a vessel connected to said solids outlet to receive the discharge of solids, a second conduit connecting said vessel and the solids outlet, and, pressure balance means to maintain a height of solids in said second conduit to provide a positive seal between the chamber and vessel, said pressure balance means being a pressure control valve on said solids discharge vessel.

13. The separation system of claim 9 or 12 further comprising quench means located in the first conduit.

14. The separation system of claim 9 or 12 wherein the secondary separator is a cyclone.

* * * * *